US009245380B2

(12) United States Patent
Kim et al.

(10) Patent No.: US 9,245,380 B2
(45) Date of Patent: Jan. 26, 2016

(54) LOCAL MULTI-RESOLUTION 3-D FACE-INHERENT MODEL GENERATION APPARATUS AND METHOD AND FACIAL SKIN MANAGEMENT SYSTEM

(75) Inventors: Kap Kee Kim, Daejeon (KR); Seung Uk Yoon, Gyeonggi-do (KR); Bon Woo Hwang, Daejeon (KR); Ji Hyung Lee, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 722 days.

(21) Appl. No.: 13/563,367

(22) Filed: Jul. 31, 2012

(65) Prior Publication Data

US 2013/0050434 A1 Feb. 28, 2013

(30) Foreign Application Priority Data

Aug. 24, 2011 (KR) .................. 10-2011-0084703

(51) Int. Cl.
*H04N 13/02* (2006.01)
*G06T 17/00* (2006.01)

(52) U.S. Cl.
CPC ............. *G06T 17/00* (2013.01); *G06T 2200/08* (2013.01)

(58) Field of Classification Search
None
See application file for complete search history.

(56) References Cited

U.S. PATENT DOCUMENTS

| 4,965,442 | A * | 10/1990 | Girod | G02B 7/36 250/201.7 |
| 6,571,003 | B1 * | 5/2003 | Hillebrand | A61B 5/0064 382/100 |
| 7,324,668 | B2 * | 1/2008 | Rubinstenn | A45D 44/005 382/118 |
| 7,844,076 | B2 * | 11/2010 | Corcoran | G06T 5/00 348/152 |
| 2002/0158984 | A1 * | 10/2002 | Brodsky | H04N 13/0217 348/340 |
| 2003/0065523 | A1 * | 4/2003 | Pruche | A45D 44/005 382/118 |
| 2006/0164552 | A1 * | 7/2006 | Cutler | H04N 5/2628 348/576 |
| 2008/0317284 | A1 * | 12/2008 | Inada | G06T 7/20 382/103 |
| 2010/0208091 | A1 * | 8/2010 | Chang | H04N 5/23219 348/222.1 |
| 2010/0214421 | A1 * | 8/2010 | Qu | G01J 3/46 348/207.1 |
| 2010/0239119 | A1 * | 9/2010 | Bazakos | G06K 9/00261 382/103 |
| 2011/0063446 | A1 * | 3/2011 | McMordie | G06K 9/00255 348/159 |
| 2011/0128385 | A1 | 6/2011 | Bedros et al. | |
| 2011/0187876 | A1 * | 8/2011 | Lee | H04N 5/232 348/207.11 |

FOREIGN PATENT DOCUMENTS

KR 1020030018417 A 3/2003
KR 1020050083197 A 8/2005

* cited by examiner

*Primary Examiner* — Jefferey Harold
*Assistant Examiner* — Humam Satti

(57) ABSTRACT

The present invention provides a local multi-resolution 3-D face-inherent model generation apparatus, including one or more 3-D facial model generation cameras for photographing a face of an object at various angles in order to obtain one or more 3-D face models, a 3-D face-inherent model generation unit for generating a 3-D face-inherent model by composing the one or more 3-D face models, a local photographing camera for photographing a local part of the face of the object, a control unit for controlling the position of the local photographing camera on the 3-D face-inherent model, and a local multi-resolution 3-D face-inherent model generation unit for generating a local multi-resolution face-inherent model by composing an image captured by the local photographing camera and the 3-D face-inherent model, a local multi-resolution 3-D face-inherent model generation using the local multi-resolution 3-D face-inherent model generation apparatus, and a skin management system.

13 Claims, 9 Drawing Sheets

LOCAL MULTI-RESOLUTION 3-D FACE-INHERENT MODEL GENERATION APPARATUS AND METHOD AND FACIAL SKIN MANAGEMENT SYSTEM

Priority to Korean patent application number 10-2011-0084703 filed on Aug. 24, 2011, the entire disclosure of which is incorporated by reference herein, is claimed.

BACKGROUND OF THE INVENTION

1. Field of the Invention

The present invention relates to a local multi-resolution 3-D face model generation apparatus and method and a facial skin management system and, more particularly, to an apparatus and method for comprehensively measuring and diagnosing pores, oil contents, water, and the state of elasticity for the facial skin of a human being and a facial skin management system.

2. Discussion of the Related Art

In general, the type of the skin is classified into an oily skin, a dry skin, and a neutral skin according to the amount of secretion of sebum, and complexity and sensitiveness are added to the type of the skin.

As a method of detecting the type of the skin, first, after facial cleansing is cleanly performed in the evening, after a lapse of 15 to 20 minutes with nothing put on a face, if sebum appears in the entire face, the type of the skin is an oily skin. If there is a feeling of rustling and the face looks like being pulled, the type of the skin is the dry skin. If there is no feeling of pulling in the face and nothing special is found, the type of the skin is the neutral skin.

Furthermore, in the complexity skin, the amount of sebum secretion is a lot in the forehead or a nose, but there is a feeling of rustling in a cheek. That is, the complexity skin has two or more kinds of skin properties, that is, the oily skin and the dry skin owing to imbalance in the amount of sebum secretion.

In the sensitiveness skin, the skin looks read because a capillary vessel is expanded and the circulation of the blood is not good. When a person enter the interior of a warm room from a cold place, the skin may itch and a face may turn read. In this case, a skin is commonly classified as the sensitiveness skin.

Skin information according to the above method is based on an individual's feeling or presumption. Accordingly, the skin information is not scientific and rational and is unsuitable for being used as skin management information.

In order to solve the problem, there is a need for rational skin management according to diagnosis by performing scientifically accurate and comprehensive skin measurement.

For scientific skin measurement, Korean Patent Laid-Open Publication No. 2003-0018417 discloses a system for measuring oily contents, water, pores, and wrinkles of a facial skin. In the conventional invention, however, measurement is limited to the oily contents, water, pores, and wrinkles of the skin, and comprehensive skin measurement is not possible. Furthermore, water in the skin must be gathered by an adsorption sheet using additional sample gathering means when water is measured and samples of the gathered water must be photographed using oil and water photographing means in order to obtain image information. This process is complicate and inconvenient.

Furthermore, an operator manually touches a conventional camera, a sensor, etc. for providing comprehensive information about the skin on the skin of the object, photographs the skin, and obtains information about the skin. Furthermore, when the approximate state of a facial skin is sought to be measured, an operator has to obtain a 2-D image using a high resolution camera and analyze the obtain 2-D image. In order to obtain comprehensive information about a facial skin, the facial skin must be photographed again using a contact type local photographing sensor other than the high resolution camera. In this case, after the facial skin is photographed before the high resolution camera is used, the face must be separated from the equipment and the contact type local photographing camera must be then manually adhered to the skin.

PRIOR ART DOCUMENT

Patent Document (Patent Document 1) Korean Patent Laid-Open Publication No. 10-2005-0083197 entitled 'Skin diagnosis system' by ARAM HUVIS Corp. (Aug. 26, 2005)

SUMMARY OF THE INVENTION

An object of the present invention is to provide a local multi-resolution 3-D face model generation apparatus and method and a facial skin management system, which can obtain comprehensive information about the skin through one photographing instead of several photographings.

Another object of the present invention is to provide a local multi-resolution 3-D face model generation apparatus and method and a facial skin management system, in which repetitive local photographing tasks for obtaining approximate state information or comprehensive information about the skin are automated and which may be easily operated by an operator.

A local multi-resolution 3-D face-inherent model generation apparatus according to an embodiment of the present invention may include one or more 3-D facial model generation cameras for photographing a face of the object at various angles in order to obtain one or more 3-D face models; a 3-D face-inherent model generation unit for generating a 3-D face-inherent model by composing the one or more 3-D face models; a local photographing camera for photographing a local part of the face of the object; a control unit for controlling the position of the local photographing camera on the 3-D face-inherent model; and a local multi-resolution 3-D face-inherent model generation unit for generating a local multi-resolution face-inherent model by composing an image captured by the local photographing camera and the 3-D face-inherent model.

The control unit may select any one control mode of an automatic mode for automatically controlling the position of the local photographing camera based on characteristic points of a 3-D face standard model produced based on a common face and a manual mode for externally receiving a local part of the face of the object to be locally photographed and controlling the position of the local photographing camera based on the input position and may control the selected mode.

The control unit may include a mapping information conversion unit for converting mapping information about a 3-D face standard model produced based on a common face into mapping information about the 3-D face-inherent model through a model transition; an input coordinate calculation unit for externally receiving a local part of the face of the object to be locally photographed and calculating 3-D coordinates of the input position; and a local photographing camera movement control unit for moving the local photographing camera to a position indicated by the converted mapping information of the 3-D face-inherent model or the calculated 3-D coordinates.

The mapping information conversion unit of the control unit may convert mapping information about basic characteristic points, stored in the 3-D face standard model, into the mapping information about characteristic points of the 3-D face-inherent model, and the local photographing camera movement control unit of the control unit may automatically move the local photographing camera to the position indicated by the mapping information of the characteristic points of the 3-D face-inherent model.

The 3-D facial model generation camera may be at least one of a 3-D scanner, a structured light camera, and a stereo camera.

The local photographing camera may be at least one of a contact type local photographing camera and a contactless type local photographing camera.

The contact type local photographing camera may be used in order to obtain information about oil contents and water of the local part of the face of the object, and the contactless type local photographing camera may be used in order to obtain general information about the local part of the face of the object.

The local photographing camera may be the contactless type local photographing camera, and the local photographing camera may use a different resolution and lens focal distance from the 3-D facial model generation camera in order to acquire the general information of the local part of the face of the object.

A multi-resolution 3-D face-inherent model generation method according to an embodiment of the present invention may include photographing, by the one or more 3-D facial model generation cameras, a face of the object at various angles in order to obtain one or more 3-D face models; generating, by the 3-D face-inherent model generation unit, a 3-D face-inherent model by composing the one or more 3-D face models; photographing, by the local photographing camera, a local part of the face of the object; controlling, by a control unit, the position of the local photographing camera on the 3-D face-inherent model; and generating, by the local multi-resolution 3-D face-inherent model generation unit, a local multi-resolution face-inherent model by composing an image captured by the local photographing camera and the 3-D face-inherent model.

Controlling, by the control unit, the position of the local photographing camera may include selecting any one control mode of an automatic mode for automatically controlling the position of the local photographing camera based on characteristic points of a 3-D face standard model produced based on a common face and a manual mode for externally receiving a local part of the face of the object to be locally photographed and controlling the position of the local photographing camera based on the input position and controlling the selected mode.

Controlling, by the control unit, the position of the local photographing camera in the automatic mode may include converting, by the mapping information conversion unit, mapping information about basic characteristic points, stored in the 3-D face standard model, into the mapping information about characteristic points of the 3-D face-inherent model, and automatically moving, by the local photographing camera movement control unit, the local photographing camera to the position indicated by the mapping information of the characteristic points of the 3-D face-inherent model.

Controlling, by the control unit, the position of the local photographing camera in the manual mode may include externally receiving, by the input coordinate calculation unit, a local part of the face of the object to be locally photographed and calculating 3-D coordinates of the input position; and moving, by the local photographing camera movement control unit, the local photographing camera to a position indicated by the converted mapping information of the 3-D face-inherent model or the calculated 3-D coordinates.

A facial skin management system according to an embodiment of the present invention may include a local multi-resolution 3-D face model generation apparatus for obtaining one or more 3-D face models by photographing a face of the object at various angles and for generating a local multi-resolution face-inherent model by composing a 3-D face-inherent model, generated by composing the one or more 3-D face models, and a local photographing image obtained by locally photographing a local part of the face of the object; and a skin diagnosis apparatus for diagnosing the skin state of the face of the object through the local multi-resolution 3-D face-inherent mode, while operating in conjunction with the local multi-resolution 3-D face model generation apparatus, and for performing a simple test.

The local multi-resolution 3-D face model generation apparatus may include one or more 3-D facial model generation cameras for photographing the face of the object at various angles in order to obtain the one or more 3-D face models; a 3-D face-inherent model generation unit for generating the 3-D face-inherent model by composing the one or more 3-D face models; a local photographing camera for photographing the local part of the face of the object; a control unit for controlling the position of the local photographing camera on the 3-D face-inherent model; and a local multi-resolution 3-D face-inherent model generation unit for generating the local multi-resolution face-inherent model by composing the 3-D face-inherent model and the image captured by the local photographing camera.

The control unit may select any one control mode of an automatic mode for automatically controlling the position of the local photographing camera based on characteristic points of a 3-D face standard model produced based on a common face and a manual mode for externally receiving the local part of the face of the object to be locally photographed and for controlling the position of the local photographing camera based on the input position and may control the selected mode.

The control unit may include a mapping information conversion unit for converting mapping information about a 3-D face standard model produced based on a common face into mapping information about the 3-D face-inherent model through a model transition; an input coordinate calculation unit for externally receiving a local part of the face of the object to be locally photographed and calculating 3-D coordinates of the input position; and a local photographing camera movement control unit for moving the local photographing camera to a position indicated by the converted mapping information of the 3-D face-inherent model or the calculated 3-D coordinates.

The mapping information conversion unit of the control unit may convert mapping information about basic characteristic points, stored in the 3-D face standard model, into the mapping information about characteristic points of the 3-D face-inherent model, and the local photographing camera movement control unit of the control unit may automatically move the local photographing camera to the position indicated by the mapping information of the characteristic points of the 3-D face-inherent model.

The skin diagnosis apparatus may diagnose water, oil contents, roughness, the size of a pore, the state of wrinkles, and the amount of sebum of the skin of the object skin and whether pigmentation exists or not in the skin of the object.

The skin diagnosis apparatus may include a database for storing the skin state of the object for each date; a skin diagnosis unit for performing a comprehensive diagnosis of the skin of the object; a skin test unit for making a simple test on the skin of the object; and a skin comparison unit for comparing the skin of the object with a sample skin.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
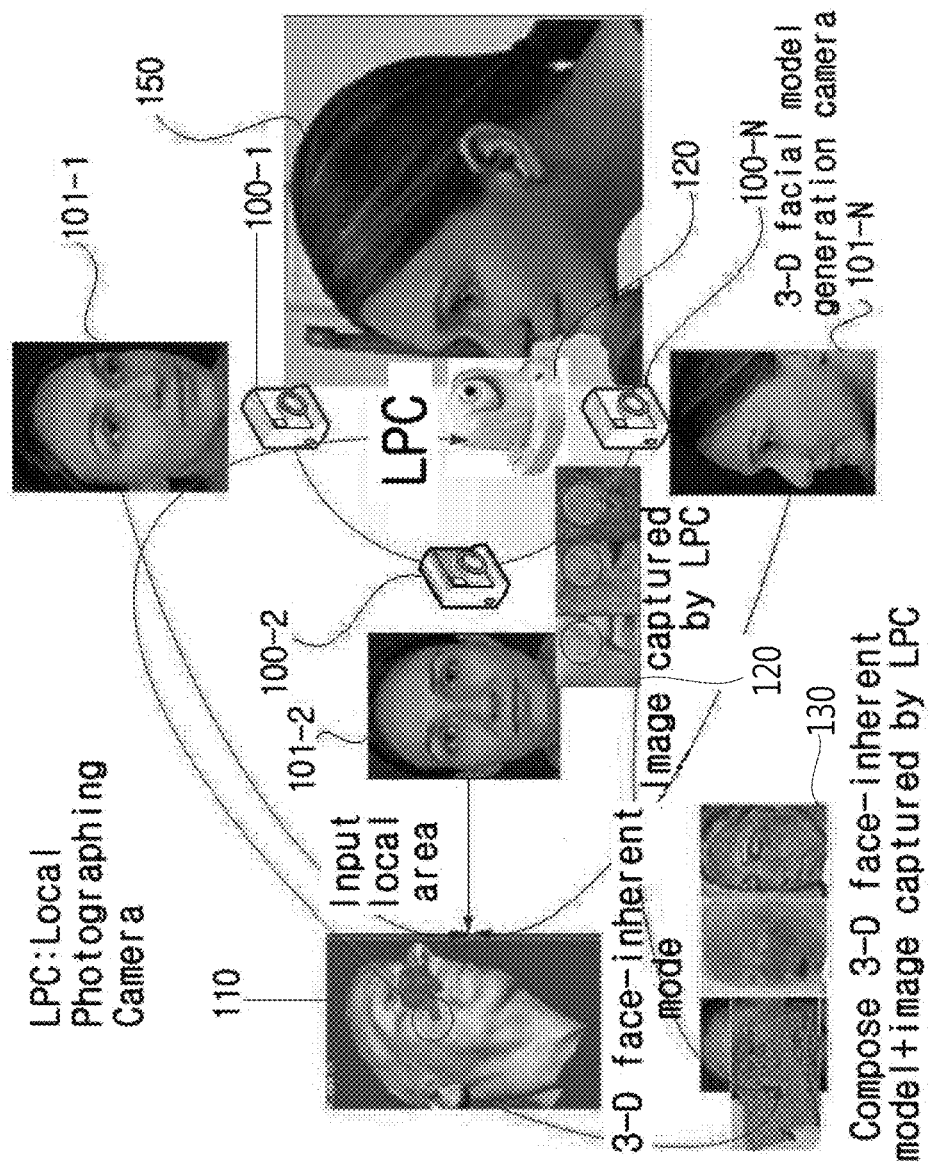
FIG. 1 is a diagram schematically showing a concept for the generation of a local multi-resolution 3-D face-inherent model of the present invention.

The present invention may be modified in various ways and may have several embodiments. Specific embodiments of the present invention are illustrated in the drawings and described in detail in the detailed description.

However, the present invention is not intended to be limited to the specific embodiments, and it should be understood that the present invention includes all modifications, equivalents, or substitutions which fall within the spirit and technical scope of the present invention Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

All the terms used herein, unless otherwise defined, have the same meanings which are typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, preferred embodiments of to present invention will be In describing the present invention, throughout the in order to facilitate overall understanding, and a redundant description of the same elements is omitted.

FIG. 1 is a diagram schematically showing a concept for the generation of a local multi-resolution 3-D face-inherent model 130 of the present invention. As shown in FIG. 1, the local multi-resolution 3-D face-inherent model 130 of the present invention may be generated by composing images captured by one or more 3-D facial model generation cameras 100-1, 100-2 to 100-N and a local photographing camera 120.

The first thing to generate the local multi-resolution 3-D face-inherent model 130 is to fix a face of the object 150. In order to fix the face, means for fixing the crown part of the head and the jaws may be used. After the face of the object 150 is fixed as described above, the 3-D facial model generation cameras 100-1, 100-2 to 100-N are disposed at positions where the face of the object 150 can be generally photographed. Basically, in order to photograph the general contour of the face, it is preferred that the 3-D facial model generation cameras 100-1, 100-2 to 100-N be placed in the front of the face and on both sides of the face.

One or more 3-D face models 101-1, 101-2 to 101-N are obtained by using the one or more 3-D facial model generation cameras 100-1, 100-2 to 100-N. A 3-D face-inherent model 110 is formed by composing the one or more 3-D face models 101-1, 101-2 to 101-N. Since the 3-D face models 101-1, 101-2 to 101-N are obtained by photographing the face of the object 150 at various angles, the face unique to the object 150 may be represented by combining the 3-D face models 101-1, 101-2 to 101-N, which becomes the 3-D face-inherent model 110. The 3-D face-inherent model 130 is used as a base model of the local multi-resolution 3-D face-inherent model, that is, the final generation result. The 3-D face-inherent model 130 provides geometrical information about the high resolution images 101-1, 101-2 to 101-N captured by the 3-D facial model generation cameras 100-1, 100-2 to 100-N and about an ultra-high resolution image 121 captured by the local photographing camera 120 and becomes a base on which pieces of additional information (e.g., water and oil contents) will be displayed on a screen.

When an operator designates a part that will be photographed in an automatic mode or a manual mode in the 3-D face-inherent model 110, the local photographing camera 120 photographs the designated part in a contact or contactless way. The local photographing camera 120 does not obtain information about all the parts of the face of the object 150 from the operator manually, but chiefly photographs the designated part. When photographing the designated part, the local photographing camera 120 finds the designated part on the basis of a part stored in a 3-D face standard model (not shown). The 3-D face standard model is a face model which has been previously produced on the basis of a common face and may be stored in an external database or a control unit. Furthermore, the characteristic points of the 3-D face standard model are also stored in the database or the control unit. The position of the characteristic point of the 3-D face standard model is connected to the position of a characteristic point on the 3-D face-inherent model 110 through a model transition method when the local photographing camera 120 is automatically operated.

The 3-D face-inherent model 110 and a local photographing camera-obtained image 121 (i.e., the ultra-high resolution image) obtained using the method are combined by a local multi-resolution 3-D face-inherent model generation unit (not shown). The result combined as described above is the local multi-resolution 3-D face-inherent model and is a model which is a basis for diagnosing the skin while operating in conjunction with a skin management system.

Figure 2:
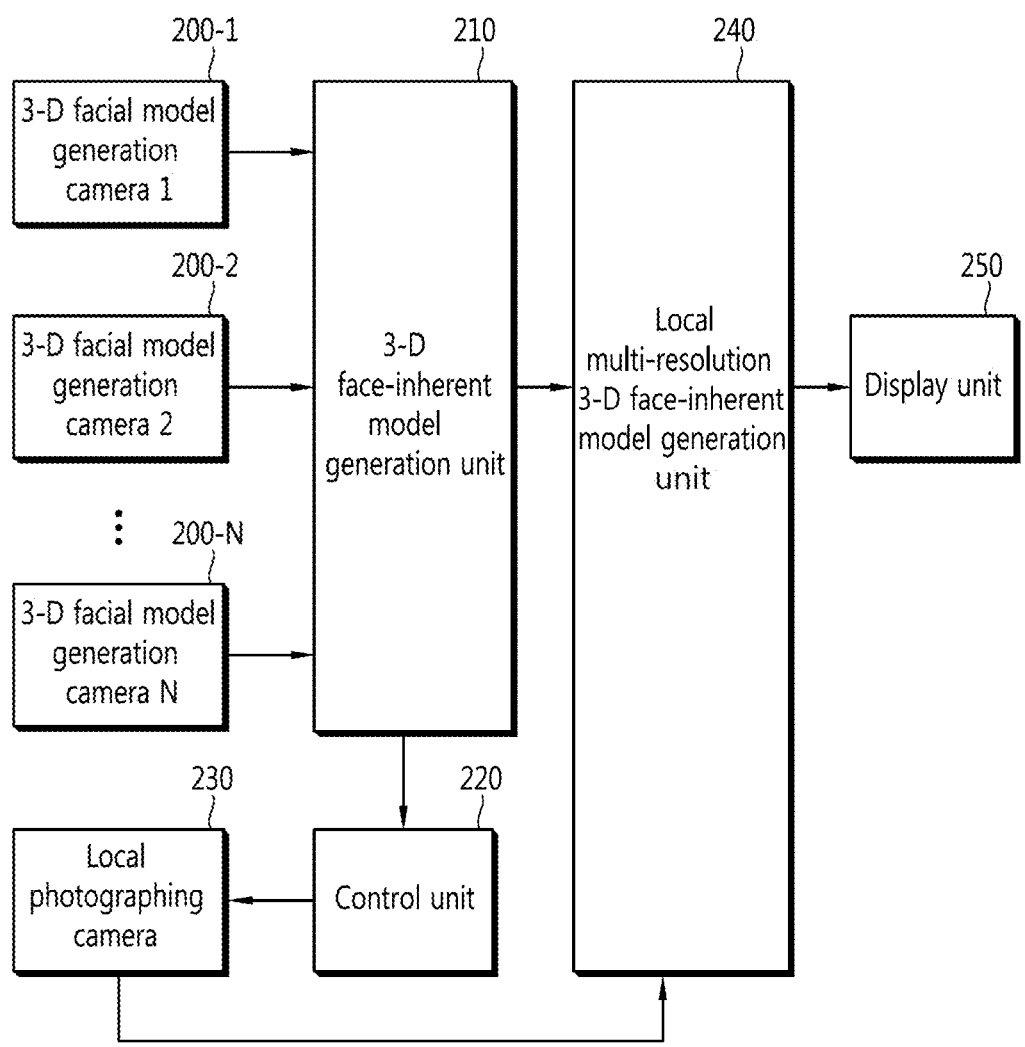
FIG. 2 is a block diagram of a local multi-resolution 3-D face-inherent model generation apparatus according to an embodiment of the present invention.

FIG. 2 is a block diagram of a local multi-resolution 3-D face-inherent model generation apparatus according to an embodiment of the present invention. As described above, one or more 3-D facial model generation cameras 200-1, 200-2 to 200-N photograph several parts of a face of the object at various angles in order to compose the general contour of the face of the object. The 3-D facial model generation cameras 200-1, 200-2 to 200-N may become 3-D scanners, structured light cameras, or stereo cameras. Each of the 3-D facial model generation cameras 200-1, 200-2 to 200-N obtains a 3-D face model using a restoration algorithm, and a 3-D face-inherent model is generated by composing the one or more 3-D face models. The 3-D facial model generation cameras 200-1, 200-2 to 200-N have external and internal parameters through calibration. Furthermore, the 3-D facial model generation cameras 200-1, 200-2 to 200-N have the origin different from other sensors used in a skin management system.

A 3-D face-inherent model generation unit 210 generates a 3-D face-inherent model by combining images captured by the 3-D facial model generation cameras 200-1, 200-2 to 200-N. Inputs are the images obtained from the 3-D face-inherent model generation cameras 200-1, 200-2 to 200-N, and they may differ depending on the number of images according to image capturing sensors. Furthermore, a restoration method differs according to the types of the 3-D facial model generation cameras 200-1, 200-2 to 200-N. For example, in case of a 3-D scanner, a one 3-D outward shape restoration image is outputted. In case of stereo restoration, images are outputted from two or more monocular cameras.

The 3-D face-inherent model is subsequently used as the base model of the local multi-resolution 3-D face-inherent model. In particular, when a local photographing camera 230 is manually controlled, the local photographing camera 230 is moved to a position on the 3-D face-inherent model, indicated by an operator, on the basis of the 3-D face-inherent model. As described above, the 3-D face-inherent model provides geometrical information to be controlled in a high resolution image and an ultra-high resolution image captured by the local photographing camera 230. Furthermore, the 3-D face-inherent model may become a base on which additional pieces of information related to the facial skin, such as water and oil contents, will be displayed in a display unit 250.

A control unit 220 functions to control the local photographing camera 230 so that the local photographing camera 230 photographs a selected position in the automatic mode or the manual mode selected by an operator. If photographing is performed in the automatic mode, a previously produced 3-D face standard model is used. The 3-D face standard model is a 3-D model which has been produced on the basis of a common face, and it stores characteristic points from which the state of the skin can be easily known. An external database or the control unit 220 stores the 3-D face standard model and basic characteristic point on the 3-D face standard model.

The control unit 230 maps the characteristic points of the 3-D face standard model to mapping information about the generated 3-D face-inherent model. The local photographing camera 230 is moved to a position indicated by the mapped characteristic points on the 3-D face-inherent model. In case of the manual mode, when an operator indicates a position to be photographed on the 3-D face standard model, the local photographing camera 230 is moved to the indicated position.

The local photographing camera 230 photographs one place of the position automatically or manually designated by an operator on the 3-D face-inherent model in a contact or contactless way. Whether to photograph the place by coming in contact with the skin of the object or to photograph the place in a contactless manner is related to whether the local photographing camera 230 obtains what information about the photographed part, that is, photographing is performed using what sensor. In order to obtain information about oil contents and water, it is preferred that a contact type local photographing camera be used. This is because oil contents and water can be known when photographing is performed by closely adhering the contact type local photographing camera to the skin because the oil contents and water are pieces of information within the skin. Here, information is obtained by chiefly photographing designated characteristic points without obtaining the information by coming in contact with all the parts of the face. When the designated characteristic points are photographed as described above, the 3-D face standard model is automatically operated. If a specific part of the 3-D face-inherent model is manually indicated, 3-D coordinate values for the specific part are calculated from the 3-D face-inherent model. The local photographing camera 230 moves to the calculated values and photographs the specific part. The contactless photographing of the local photographing camera 230 is used in order to obtain information about the entire face of the object. The local photographing camera 230 may have a different resolution and lens focal distance from the 3-D face-inherent model generation cameras 200-1, 200-2 to 200-N.

The local multi-resolution 3-D face-inherent model generation unit 240 generates the local multi-resolution 3-D face-inherent model by composing the image, captured by the local photographing camera 230, and the 3-D face-inherent model. The local multi-resolution face-inherent model is generated as a result of this process, which is used as a base model in the skin management system.

The display unit 250 displays the local multi-resolution face-inherent model generated as described above. Furthermore, the display unit 250 may also display the 3-D face-inherent model. By displaying the 3-D face-inherent model, an operator can designate a position where local photographing will be performed on the displayed 3-D face-inherent model.

Figure 3:
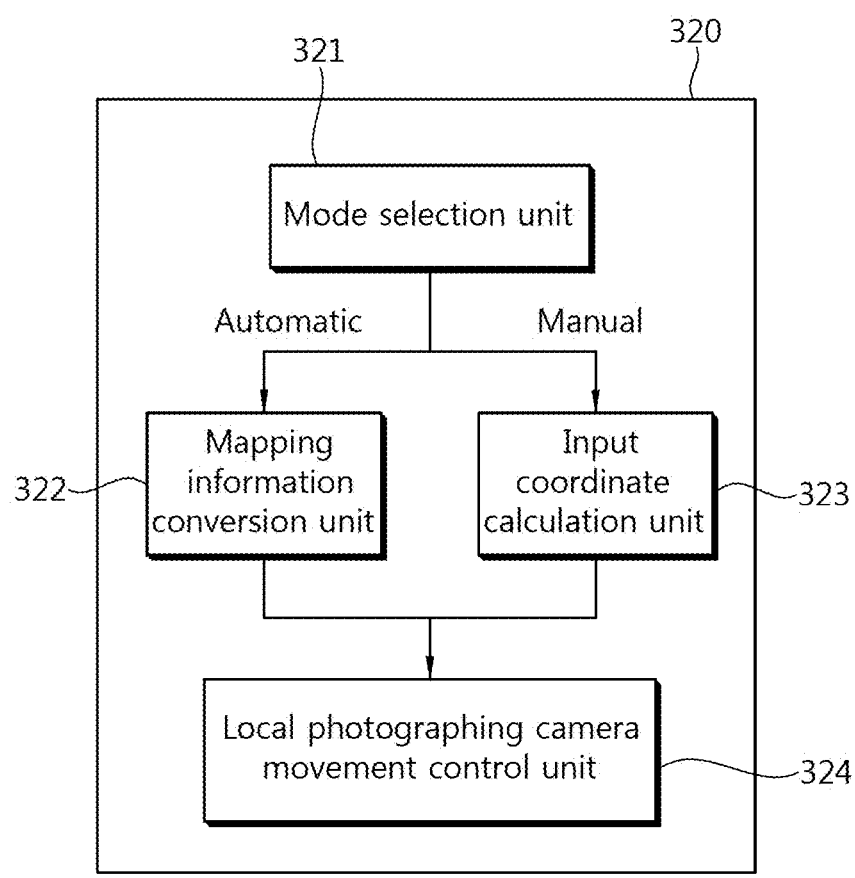
FIG. 3 is a detailed block diagram showing a control unit of the local multi-resolution 3-D face-inherent model generation apparatus according to an embodiment of the present invention.

FIG. 3 is a detailed block diagram showing a control unit 320 of the local multi-resolution 3-D face-inherent model generation apparatus according to an embodiment of the present invention. As shown in FIG. 3, the control unit 320 may include a mode selection unit 321 for selecting the automatic mode or the manual mode, a mapping information conversion unit 322 for converting mapping information about a 3-D standard face model into mapping information about a 3-D face-inherent model, an input coordinate calculation unit 323 for calculating 3-D input coordinates for input on the 3-D face-inherent model, and a local photographing camera movement control unit 324 for moving the local photographing camera to a position indicated by converted mapping information or calculated input coordinates.

The mode selection unit 321, as described above, performs a function of enabling an operator to select the automatic mode or the manual mode. When the automatic mode is selected, the local photographing camera is controlled through the mapping information conversion unit 322 and the local photographing camera movement control unit 324. When the manual mode is selected, the local photographing camera is controlled through the input coordinate calculation unit 323 and the local photographing camera movement control unit 324.

First, the automatic mode is described below. The control unit 320 controlled the local photographing camera by using the mapping information conversion unit 322 and the local photographing camera movement control unit 324. In this case, a 3-D face standard model is used as described above.

The mapping information conversion unit 322 converts mapping information about the characteristic points of a 3-D face standard model into mapping information on a 3-D face-inherent model through a model transition. The local photographing camera movement control unit 324 moves the local photographing camera to a position indicated by each of the characteristic points on the basis of the mapping information on the 3-D face-inherent model. As described above, information about local areas photographed based on the mapping information about the characteristic points on the 3-D face-inherent model is automatically generated without input by an operator.

In the manual mode, the control unit 320 controls the local photographing camera by using the input coordinate calculation unit 323 and the local photographing camera movement control unit 324.

The input coordinate calculation unit 323 receives the Graphic User Interface (GUI) input of an operator on the 3-D face-inherent model and generates an input area point based on the received GUI input. Next, the input coordinate calculation unit 323 calculates the 3-D coordinates of the input area point on the 3-D face-inherent model. The local photographing camera movement control unit 324 moves the local photographing camera to a position indicated by the calculated 3-D coordinates.

The local photographing camera movement control unit 324 functions to directly move the local photographing camera in the automatic or manual mode. Here, the local photographing camera movement control unit 324 may calculate the number of rotations of the control motor of a local photographing camera to be contacted on the basis of the mapping information of the characteristic points or the 3-D coordinates of the selected area and move the local photographing camera to the position by rotating the local photographing camera.

Figure 4:
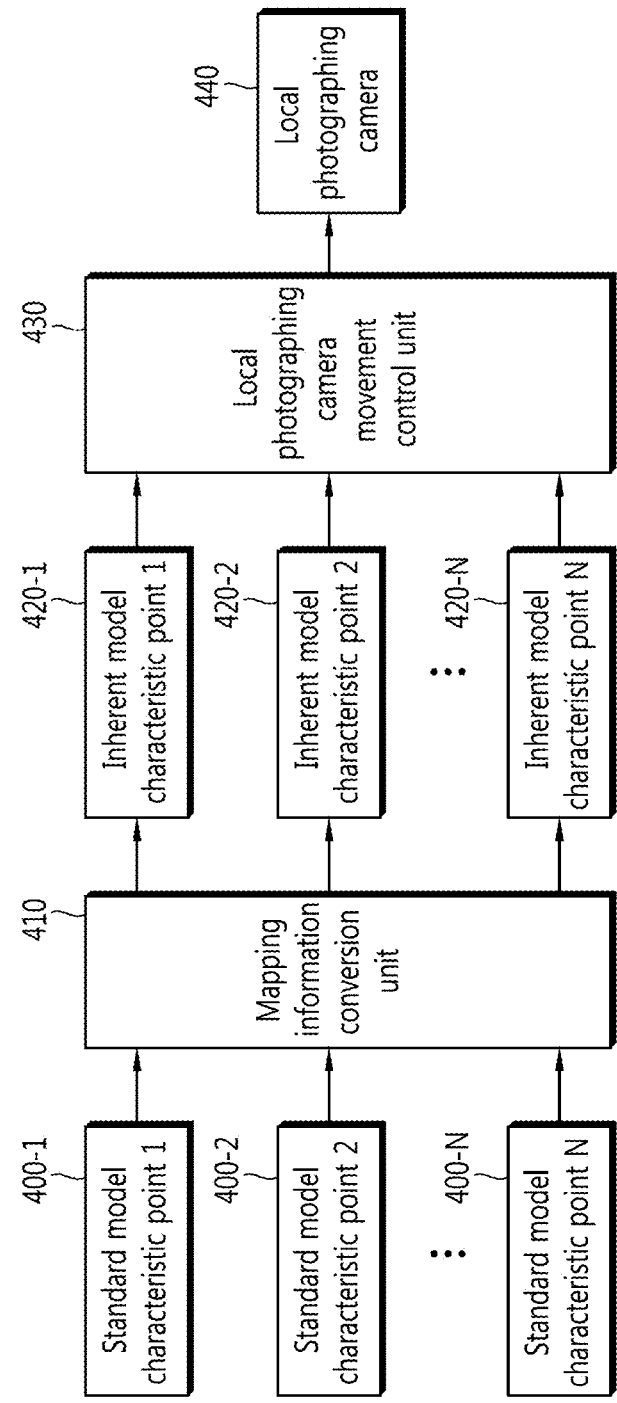
FIG. 4 is a diagram illustrating that a control unit of the local multi-resolution 3-D face-inherent model generation apparatus controls a local photographing camera according to an embodiment of the present invention.

FIG. 4 is a diagram illustrating that the control unit of the local multi-resolution 3-D face-inherent model generation apparatus controls a local photographing camera according to an embodiment of the present invention. As shown in FIG. 4, when the local multi-resolution 3-D face-inherent model generation apparatus according to the present invention is operated in the automatic mode, the characteristic points 400-1, 400-2 to 400-N of a 3-D face standard model are inputted to a mapping information conversion unit 410. The characteristic points 400-1, 400-2 to 400-N of the 3-D face standard model indicate positions which most well indicate the characteristics of a face in the 3-D face standard model previously stored in an external database or the control unit on the basis of a common face.

The mapping information conversion unit 410 receives the characteristic points 400-1, 400-2 to 400-N of the 3-D face standard model as input and converts mapping information about each of coordinates into mapping information about each of the characteristic points 420-1, 420-2 to 420-N of the 3-D face-inherent model. For example, if the position of a left eye in a standard model is a standard model characteristic point 1 400-1, the mapping information conversion unit 410 converts mapping information about the standard model characteristic point 1 400-1 and outputs a characteristic point 420-1 of a face-inherent model. The characteristic point 1 420-1 of the face-inherent model indicates the position of the left eye in an inherent model. A local photographing camera movement control unit 430 moves the local photographing camera 440 to positions indicated by the inherent model characteristic points 420-1, 420-2 to 420-N converted as described above.

Figure 5:
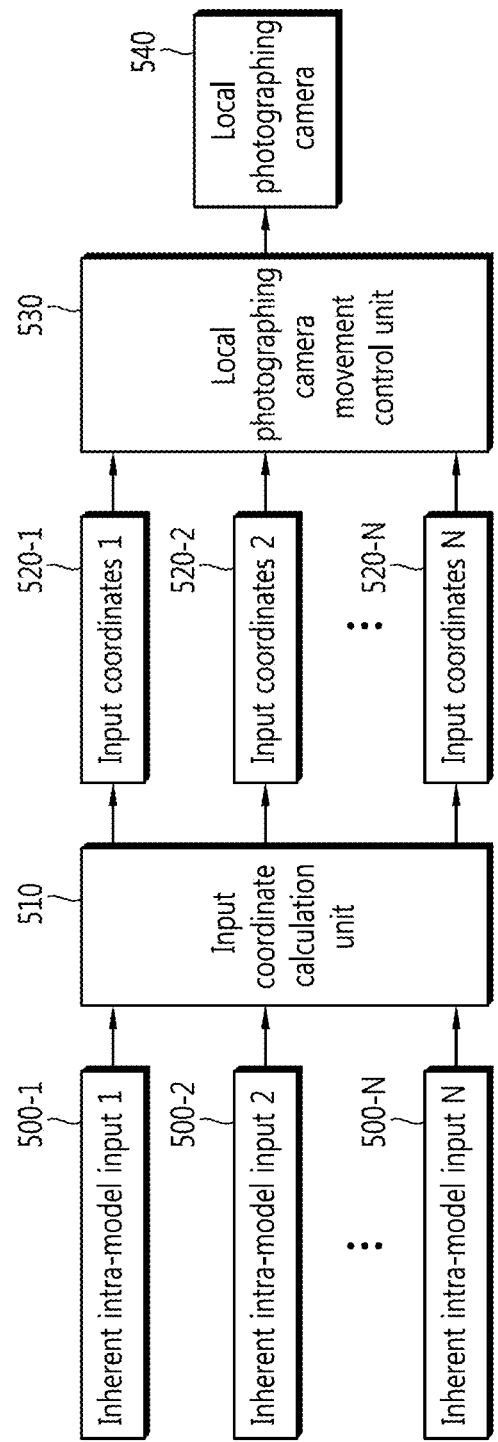
FIG. 5 is a diagram illustrating that a control unit of the local multi-resolution 3-D face-inherent model generation apparatus controls a local photographing camera according to another embodiment of the present invention.

FIG. 5 is a diagram illustrating that the control unit of the local multi-resolution 3-D face-inherent model generation apparatus controls a local photographing camera according to another embodiment of the present invent. As shown in FIG. 5, when the local multi-resolution 3-D face-inherent model generation apparatus according to the present invention is operated in the manual mode, inputs 500-1, 500-2 to 500-N selected by an operator on a 3-D face-inherent model are inputted to an input coordinate calculation unit 510. The inputs 500-1, 500-2 to 500-N on a 3-D face-inherent model indicate local areas to be photographed by an operator in a face of the object.

The input coordinate calculation unit 510 receives the inputs 500-1, 500-2 to 500-N within the 3-D face-inherent model, calculates respective 3-D coordinates 520-1, 520-2 to 520-N on the 3-D face-inherent model, and outputs the respective 3-D coordinates 520-1, 520-2 to 520-N. For example, if an operator wants to locally photograph the upper lib of the object, the upper lib is inputted as an inherent intra-model input 1 500-1 within a 3-D face standard model through GUI input. The input coordinate calculation unit 510 calculates the coordinates of the inherent intra-model input 1 500-1 and outputs the calculated coordinates as input coordinates 1 520-1. The input coordinates 1 520-1 are 3-D coordinates indicating the position of the upper lib in the inherent model. The local photographing camera movement control unit 530 moves a local photographing camera 540 to positions indicated by the input coordinates 520-1, 520-2 to 520-N calculated as described above.

After automatically or manually being moved to a position under the control of the local photographing camera movement control unit, the local photographing camera captures an image in the moved position. Local photographing can be performed in a contact or contactless manner. It is preferred that a contact type local photographing camera be used in order to obtain information about oil contents and water in a local part of a face of the object and a contactless type local photographing camera be used in order to obtain the general information about a local part of a face of the object, as described above.

The local multi-resolution 3-D face-inherent model generation unit generates a local multi-resolution 3-D face-inherent model by composing a 3-D face-inherent model and an image of a locally photographed position as described above. The local multi-resolution 3-D face-inherent model is displayed on a screen by using an interpolation method at the boundary of the 3-D facial model generation camera and the local photographing camera when the image is enlarged in a selected area.

Figure 6:
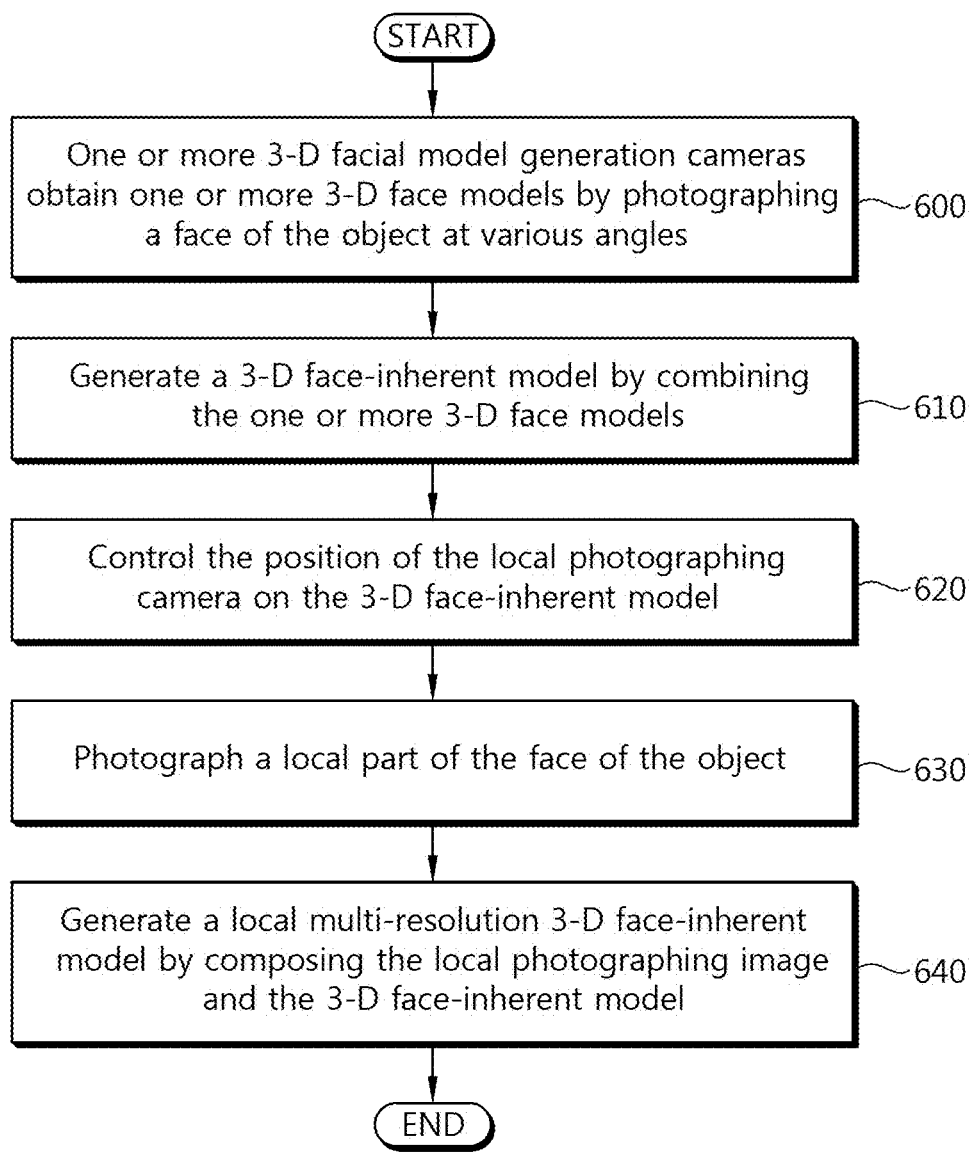
FIG. 6 is a flowchart illustrating a method of generating a local multi-resolution 3-D face-inherent model according to an embodiment of the present invention.

FIG. 6 is a flowchart illustrating a method of generating a local multi-resolution 3-D face-inherent model according to an embodiment of the present invention. As shown in FIG. 6, the method of generating a local multi-resolution 3-D face-inherent model according to the present invention may include a step where the at least one 3-D facial model generation camera photographs a face of the object at various angles in order to obtain one or more 3-D face models, a step where the 3-D face-inherent model generation unit generates a 3-D face-inherent model by composing the one or more 3-D face models, a step where the control unit automatically or manually controls the position of the local photographing camera on a 3-D face-inherent model, a step where the local photographing camera photographs a local part of the face of the object, and a step where the local multi-resolution 3-D face-inherent model generation unit generates a local multi-resolution 3-D face-inherent model by composing the image captured by the local photographing camera and the 3-D face-inherent model.

More particularly, a step that must be first performed in order to generate a local multi-resolution 3-D face-inherent model is the step of disposing the 3-D facial model generation camera in a position where a face of the object can be generally photographed and photographing the face of the object at various angles (600). Basically, in order to photograph the general contour of the face, it is preferred that the 3-D facial model generation camera be placed at the front of the face and on both sides of the face. As described above, a plurality of 3-D face models is obtained using the one or more 3-D facial model generation cameras.

Next, a 3-D face-inherent model is formed by combining the one or more 3-D face models (610). Since the 3-D face models are images of the face of the object at various angles, the face unique to the object can be represented by combining the 3-D face models, which becomes the 3-D face-inherent model. The 3-D face-inherent model is subsequently used as a base model. The 3-D face-inherent model provides geometrical information about a high resolution image captured by the 3-D facial model generation camera and a ultra-high resolution image captured by the local photographing camera and functions as a base on which pieces of additional information (e.g., water and oil contents) will be displayed on a screen.

Next, the local photographing camera is controlled so that a position selected by an operator can be photographed (620). If photographing is performed in the automatic mode, a previously produced 3-D face standard model is used. The 3-D face standard model is a 3-D model produced on the basis of a common face, and it stores characteristic points from which the state of the skin can be easily known. The control unit maps the characteristic points of the 3-D face standard model to mapping information about the generated 3-D face-inherent model. The local photographing camera is moved to a position indicated by the mapped characteristic points on the 3-D face-inherent model.

In case of the manual mode, when an operator indicates a position to be photographed on the 3-D face standard model, the local photographing camera is moved to the indicated position.

Next, the step in which the local photographing camera photographs a location part of the face of the object is performed (630). The local photographing camera photographs the position automatically or manually designated by an operator on the 3-D face-inherent model in a contact or contactless way. Whether to photograph the place by coming in contact with the skin of the object or to photograph the place in a contactless manner is related to whether the local photographing camera obtains what information about the photographed part, that is, photographing is performed using what sensor. In order to obtain information about oil contents and water, it is preferred that a contact type local photographing camera be used. This is because oil contents and water can be known when photographing is performed by closely adhering the contact type local photographing camera to the skin because the oil contents and water are pieces of information within the skin. Here, information is obtained by chiefly photographing designated characteristic points without obtaining the information by coming in contact with all the parts of the face. When the designated characteristic points are photographed as described above, the 3-D face standard model is automatically operated. If a specific part of the 3-D face-inherent model is manually indicated, 3-D coordinate values for the specific part are calculated from the 3-D face-inherent model. The local photographing camera moves to the calculated values and photographs the specific part. The contactless photographing of the local photographing camera is used in order to obtain information about the entire face of the object. The local photographing camera may have a different resolution and lens focal distance from the 3-D face-inherent model generation cameras.

Finally, the step in which a local multi-resolution 3-D face-inherent model is generated by composing the local photographing image and the 3-D face-inherent model is performed (640). The local multi-resolution 3-D face-inherent model generation unit generates the local multi-resolution 3-D face-inherent model by composing the image, captured by the local photographing camera, and the 3-D face-inherent model. The local multi-resolution face-inherent model is generated as a result of this process, which is used as a base model in the skin management system.

Figure 7:
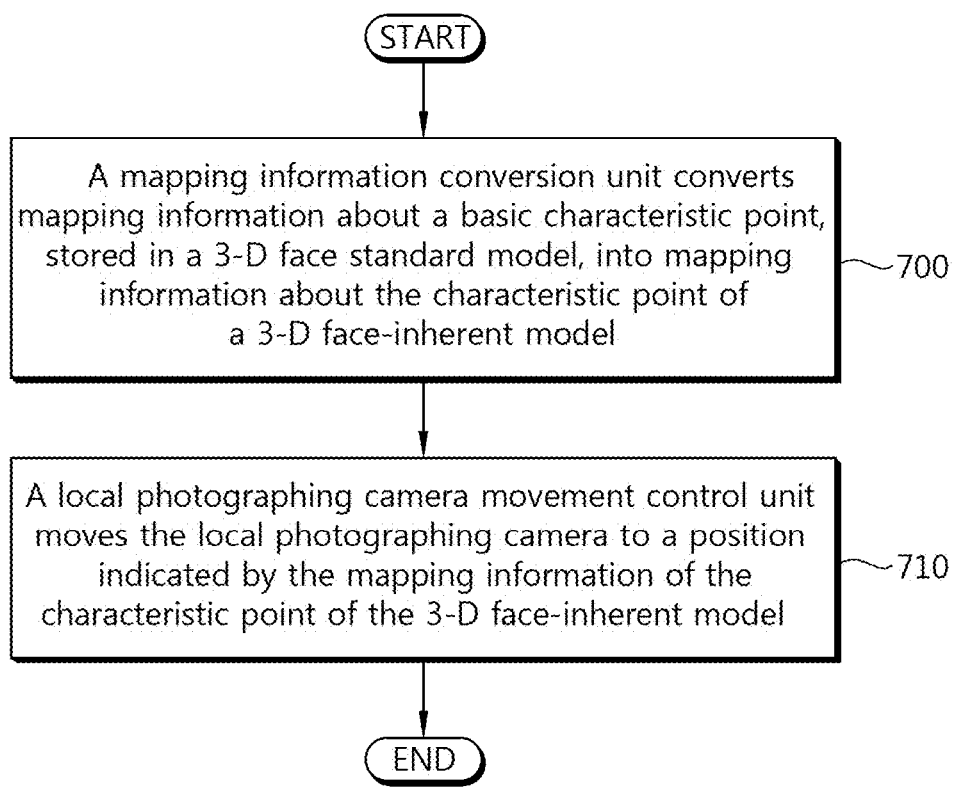
FIG. 7 is a diagram showing a method of controlling the local photographing camera in the method of generating a local multi-resolution 3-D face-inherent model according to an embodiment of the present invention.

FIG. 7 is a diagram showing a method of controlling the local photographing camera in the method of generating a local multi-resolution 3-D face-inherent model according to an embodiment of the present invention. This method corresponds to a method in which the control unit automatically controls the local photographing camera.

As shown in FIG. 7, the method of the control unit automatically controlling the local photographing camera includes a step 700 in which the mapping information conversion unit converts mapping information about a basic characteristic point, stored in a 3-D face standard model, into mapping information about the characteristic point of the 3-D face-inherent model and a step 710 in which the local photographing camera movement control unit moves the local photographing camera to a position indicated by the mapping information of the characteristic point of the 3-D face-inherent model.

In case of the automatic mode, the characteristic points of a 3-D face standard model are inputted to a mapping information conversion unit. The characteristic points of the 3-D face standard model indicate positions which most well indicate the characteristics of a face in the 3-D face standard model previously stored in an external database or the control unit on the basis of a common face.

The mapping information conversion unit receives the characteristic points of the 3-D face standard model as input and converts mapping information about each of coordinates into mapping information about each of the characteristic points of the 3-D face-inherent model. A position indicated by the characteristic point of the converted 3-D face-inherent model subsequently becomes a position where photographing is performed through the local photographing camera. Accordingly, the local photographing camera movement control unit moves the local photographing camera to the position indicated by the characteristic point on the 3-D inherent model. Here, the number of rotations of a motor for controlling the local photographing camera may be calculated on the basis of the mapping information of the characteristic points, and the local photographing camera may be moved to the position by rotating the motor by the number of rotations.

Figure 8:
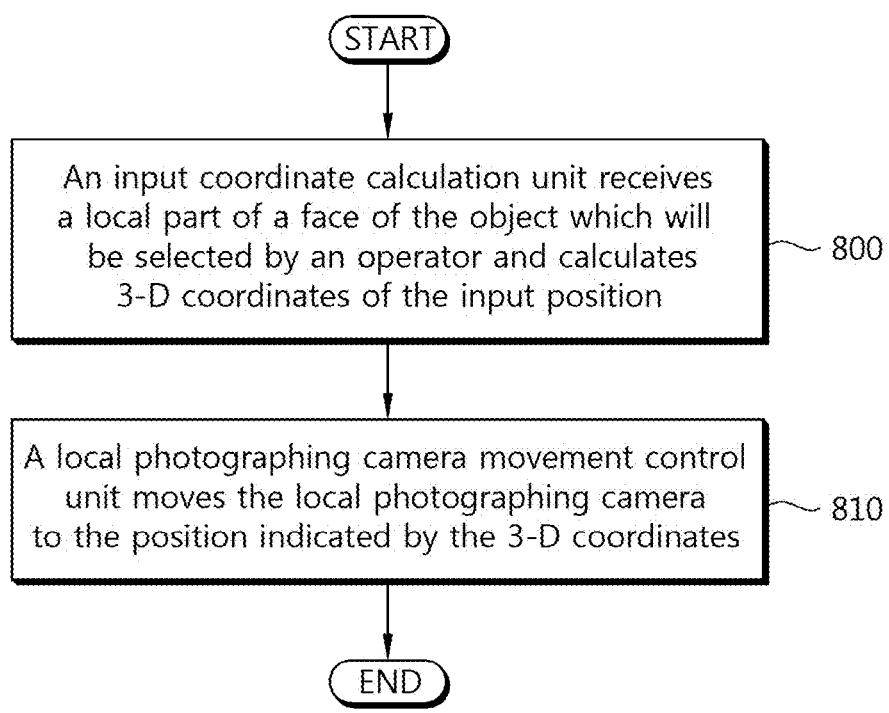
FIG. 8 is a diagram showing a method of controlling the local photographing camera in the method of generating a local multi-resolution 3-D face-inherent model according to another embodiment of the present invention.

FIG. 8 is a diagram showing a method of controlling the local photographing camera in the method of generating a local multi-resolution 3-D face-inherent model according to another embodiment of the present invention. This method corresponds to a method in which the control unit manually controls the local photographing camera.

As shown in FIG. 8, the method of the control unit manually controlling the local photographing camera includes a step 800 in which the input coordinate calculation unit receives a local part of a face of the object which will be selected by an operator and calculates 3-D coordinates of the input position and a step 810 in which the local photographing camera movement control unit moves the local photographing camera to the position indicated by the 3-D coordinates.

In case of the manual mode, a part of a face of the object selected by an operator on a 3-D face-inherent model is inputted as inputs. The inputs on the 3-D face-inherent model may be received through GUI of the operator.

The inputs within the 3-D face-inherent model are inputted to the input coordinate calculation unit. The input coordinate calculation unit calculates 3-D coordinates on the 3-D face-inherent model on the basis of the inputs within the 3-D face-inherent model and outputs the calculated 3-D coordinates. The outputted input coordinates are 3-D coordinates indicating the position where local photographing will be performed by the operator in the 3-D face-inherent model. The local photographing camera movement control unit moves the local photographing camera to a position indicated by the calculated 3-D input coordinates. As in the method of controlling the local photographing camera in the automatic mode, a difference between current coordinates of the local photographing camera may be calculated on the basis of the calculated 3-D coordinates, the number of rotations of a motor for controlling the local photographing camera may be calculated, and the local photographing camera may be moved to the position by rotating the motor by the number of rotations.

Next, the local photographing camera photographs the position automatically or manually indicated by the operator in the 3-D face-inherent model in a contact or contactless way. In this case, the local photographing camera does not obtain information about all the parts of the face of the object, but chiefly photographs the designated part.

The 3-D face-inherent model and the local photographing camera-obtained image are composed by the local multi-resolution 3-D face-inherent model generation unit. The result of the composition is a local multi-resolution 3-D face-inherent model and is a model which is a basis for diagnosing the skin of the object while operating in conjunction with a skin management system. The local multi-resolution 3-D face-inherent model may be displayed as output through the display unit.

Figure 9:
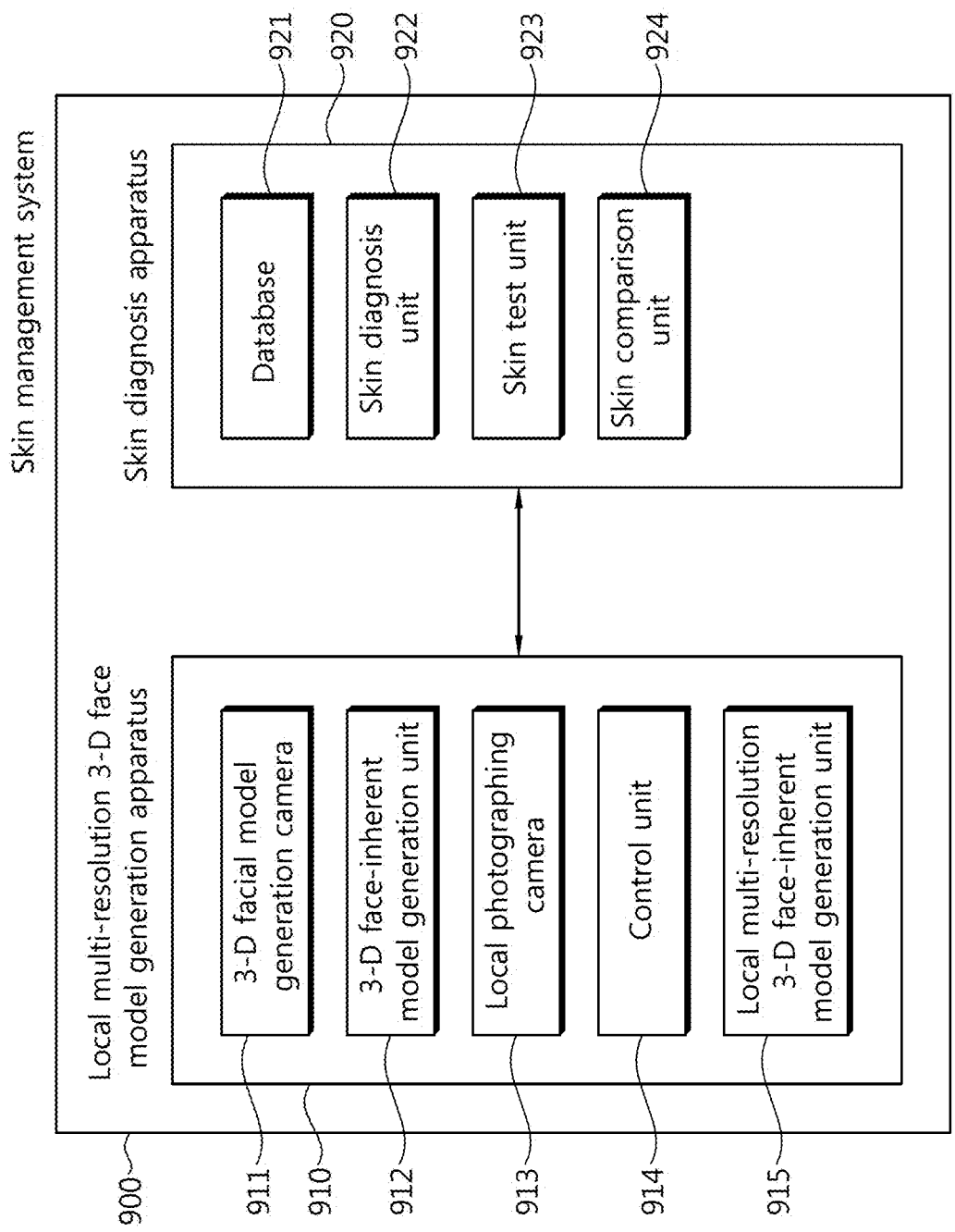
FIG. 9 is a schematic block diagram showing a facial skin diagnosis system through the generation of a local multi-resolution 3-D face-inherent model according to another embodiment of the present invention.

FIG. 9 is a schematic block diagram showing a facial skin diagnosis system 900 through the generation of a local multi-resolution 3-D face-inherent model according to another embodiment of the present invention. As shown in FIG. 9, the facial skin diagnosis system 900 according to the present invention may include a local multi-resolution 3-D face model generation apparatus 910 for obtaining one or more 3-D face models by photographing a face of the object at various angles and for generating a local multi-resolution face-inherent model by composing a 3-D face-inherent model, generated by composing the one or more 3-D face models, and a local photographing image obtained by locally photographing a local part of the face of the object, and a skin diagnosis apparatus 920 for diagnosing the skin state of the face of the object through the local multi-resolution 3-D face-inherent model while operating in conjunction with the local multi-resolution 3-D face model generation apparatus 910 and for performing a simple test.

The local multi-resolution 3-D face model generation apparatus 910 may include at least one 3-D facial model generation camera 911 for photographing a face of the object at various angles in order to obtain one or more 3-D face models, a 3-D face-inherent model generation unit 912 for generating a 3-D face-inherent model by composing the one or more 3-D face models, a local photographing camera 913 for photographing a local part of the face of the object, a control unit 914 for controlling the position of a local photographing camera on the 3-D face-inherent model, and a local multi-resolution 3-D face-inherent model generation unit 915 for generating a local multi-resolution face-inherent model by composing the 3-D face-inherent model and the image captured by the local photographing camera.

The one or more 3-D facial model generation cameras 911 photograph several parts of the face of the object at various angles in order to compose the general contour of the face of the object. As described above, the 3-D facial model generation cameras 911 may become 3-D scanners, structured light cameras, or stereo cameras. Each of the 3-D facial model generation cameras 911 obtains a 3-D face model using a restoration algorithm, and a 3-D face-inherent model is generated by composing the one or more 3-D face models. The 3-D facial model generation cameras 911 have external and internal parameters through calibration. Furthermore, the 3-D facial model generation cameras 911 have the origin different from other sensors used in a skin management system.

The 3-D face-inherent model generation unit 912 generates a 3-D face-inherent model by combining images captured by the 3-D facial model generation cameras 911. Inputs are the images obtained from the 3-D face-inherent model generation cameras 911, and they may differ depending on the number of images according to image capturing sensors. Furthermore, a restoration method differs according to the types of the 3-D facial model generation cameras 911. The 3-D face-inherent model is subsequently used as the base model of the local multi-resolution 3-D face-inherent mode. In particularly, when the local photographing camera 913 is manually controlled, the local photographing camera is moved to a position on the 3-D face-inherent model, indicated by an operator, on the basis of the 3-D face-inherent model. As described above, the 3-D face-inherent model provides geometrical information to be controlled in a high resolution image and an ultra-high resolution image captured by the local photographing camera 913. Furthermore, the 3-D face-inherent model may become a base on which additional pieces of information related to the facial skin, such as water and oil contents, will be displayed in a display unit (not shown).

The control unit 914 functions to control the local photographing camera so that the local photographing camera photographs a selected position in the automatic mode or the manual mode selected by an operator. If photographing is performed in the automatic mode, a previously produced 3-D face standard model is used. The 3-D face standard model is a 3-D model which has been produced on the basis of a common face, and it stores characteristic points from which the state of the skin can be easily known. An external database or the control unit 914 stores the 3-D face standard model and basic characteristic point on the 3-D face standard model.

The control unit 230 maps the characteristic points of the 3-D face standard model to mapping information about the generated 3-D face-inherent model. The local photographing camera 913 is moved to a position indicated by the mapped characteristic points on the 3-D face-inherent model. In the manual mode, when an operator indicates a position to be photographed on the 3-D face standard model, the local photographing camera 913 is moved to the indicated position.

The local photographing camera 913 photographs the position designated by an operator on the 3-D face-inherent model automatically or manually in a contact or contactless way. Whether to photograph the place by coming in contact with the skin of the object or to photograph the place in a contactless manner is related to whether the local photographing camera 913 obtains what information about the photographed part, that is, photographing is performed using what sensor. In order to obtain information about oil contents and water, it is preferred that a contact type local photographing camera be used. This is because oil contents and water can be known when photographing is performed by closely adhering the contact type local photographing camera to the skin because the oil contents and water are pieces of information within the skin. Here, information is obtained by chiefly photographing designated characteristic points without obtaining the information by coming in contact with all the parts of the face. When the designated characteristic points are photographed as described above, the 3-D face standard model is automatically operated. If a specific part of the 3-D face-inherent model is manually indicated, 3-D coordinate values for the specific part are calculated from the 3-D face-inherent model. The local photographing camera 913 is moved to the calculated values, and it photographs the specific part. The contactless photographing of the local photographing camera 913 is used in order to obtain information about the entire face of the object. The local photographing camera 913 may have a different resolution and lens focal distance from the 3-D face-inherent model generation cameras 911.

The local multi-resolution 3-D face-inherent model generation unit 915 generates a local multi-resolution 3-D face-inherent model by composing the 3-D face-inherent model and the images captured by the local photographing camera 913. As a result of this process, the local multi-resolution face-inherent model is produced, which is used as a base model in the skin management system.

The skin diagnosis apparatus 920, as described above, is an apparatus for diagnosing the skin state of a face of the object through a local multi-resolution 3-D face-inherent model while operating in conjunction with the local multi-resolution 3-D face model generation apparatus 910 and for performing a simple test. As shown in FIG. 9, the skin diagnosis apparatus 920 may include a database 921 for storing the skin state of the object for each date, a skin diagnosis unit 922 for performing a comprehensive diagnosis of the skin of the object, a skin test unit 923 for making a simple test on the skin of the object, and a skin comparison unit 924 for comparing the skin of the object with a sample skin.

The database 921 of the skin diagnosis apparatus 920 stores a local multi-resolution 3-D face-inherent model of the object for each date. Furthermore, the database 921 collectively stores diagnosis results and test results of the face of the object.

The skin diagnosis unit 922 diagnoses water, oil contents, roughness, the size of a pore, the state of wrinkles, and the amount of sebum of the skin of the object and whether there is pigmentation or not in the skin of the object through the local multi-resolution 3-D face-inherent model of the object.

The skin test unit 923 tests the regeneration ability of the skin of the object through the local multi-resolution 3-D face-inherent mode. Furthermore, the skin test unit 923 also performs a test on allergy antigens of the skin through an allergy responsivity test.

The skin comparison unit 924 determines whether the current skin state of the object is in what level on the basis of a normal skin by comparing the current skin state of the object with common skin samples stored in the database 921 based on the local multi-resolution 3-D face-inherent mode.

The object may perform various tests on his or her skin through the above construction and precisely checks the state of the skin.

In accordance with the local multi-resolution 3-D face-inherent model generation apparatus and method and the facial skin management system of the present invention, a 3-D face-inherent model can be generated by only adhering a face to equipment without separating the face from the equipment, and local photographing is performed by automatically controlling the local photographing camera based on mapping information about the 3-D face-inherent model transferred from a 3-D standard face model. Accordingly, a local multi-resolution 3-D face-inherent model can be composed and can be generated at once.

Furthermore, in accordance with the present invention, if an operator wants to locally photograph a characteristic part using a 3-D face-inherent model in a contact or contactless manner, the operator can easily designate a position on a screen, and a local multi-resolution 3-D face-inherent model can be easily generated by automatically composing an image photographed at the designated position and a 3-D face-inherent model.

Although the present invention has been described with reference to the embodiments and the drawings, the scope of the present invention is not limited to the embodiments and the drawings, and a person having ordinary skill in the art to which the present invention pertains may modify and change the present invention in various forms without departing from the spirit and scope of the present invention written in the claims.

What is claimed is:

1. A local multi-resolution 3-D face-inherent model generation apparatus, comprising:
one or more 3-D facial model generation cameras photographing a face of an object at various angles in order to obtain one or more 3-D face models;

a 3-D face-inherent model generation unit generating a 3-D face-inherent model from the one or more 3-D face models;

a local photographing camera photographing a local part of the face of the object while obtaining information on one of oil contents and water contents in the local part of the face;

a control unit controlling a position of the local photographing camera based on the 3-D face-inherent model;

a local multi-resolution 3-D face-inherent model generation unit generating a local multi-resolution face-inherent model by combining a photograph of the local part of the face captured by the local photographing camera with the 3-D face-inherent model; and a screen displaying the local multi-resolution 3-D face-inherent model with the information on the one of oil contents and water contents.

2. The local multi-resolution 3-D face-inherent model generation apparatus as claimed in claim 1, wherein the control unit selects a control mode that is one of an automatic mode for automatically controlling the position of the local photographing camera based on characteristic points of a 3-D face standard model produced based on a common face and a manual mode for externally receiving a local part of the face of the object to be locally photographed and controls the position of the local photographing camera based on the input position and controls the selected mode.

3. The multi-resolution 3-D face-inherent model generation apparatus as claimed in claim 1, wherein the control unit comprises:

a mapping information conversion unit converting mapping information about a 3-D face standard model produced based on a common face into mapping information about the 3-D face-inherent model through a model transition;

an input coordinate calculation unit externally receiving a local part of the face of the object to be locally photographed and calculating 3-D coordinates of the input position; and a local photographing camera movement control unit moving the local photographing camera to a position indicated by the converted mapping information of the 3-D face-inherent model or the calculated 3-D coordinates.

4. The multi-resolution 3-D face-inherent model generation apparatus as claimed in claim 3, wherein:

the mapping information conversion unit of the control unit converts mapping information about basic characteristic points, stored in the 3-D face standard model, into the mapping information about characteristic points of the 3-D face-inherent model, and the local photographing camera movement control unit of the control unit automatically moves the local photographing camera to the position indicated by the mapping information of the characteristic points of the 3-D face-inherent model.

5. The multi-resolution 3-D face-inherent model generation apparatus as claimed in claim 1, wherein the 3-D facial model generation camera is at least one of a 3-D scanner, a structured light camera, and a stereo camera.

6. The multi-resolution 3-D face-inherent model generation apparatus as claimed in claim 1, wherein the local photographing camera is at least one of a contact type local photographing camera and a contactless type local photographing camera.

7. The multi-resolution 3-D face-inherent model generation apparatus as claimed in claim 6, wherein the contactless type local photographing camera is used in order to obtain general information about the local part of the face of the object.

8. The multi-resolution 3-D face-inherent model generation apparatus as claimed in claim 7, wherein:

the local photographing camera is the contactless type local photographing camera, and the local photographing camera uses a different resolution and lens focal distance from the 3-D facial model generation camera in order to acquire the general information of the local part of the face of the object.

9. A multi-resolution 3-D face-inherent model generation method, comprising:

photographing, by one or more 3-D facial model generation cameras, a face of an object at various angles in order to obtain one or more 3-D face models;

generating, by a 3-D face-inherent model generation unit, a 3-D face-inherent model from the one or more 3-D face models;

controlling, by a control unit, a position of a local photographing camera based on the 3-D face-inherent model;

photographing, by the local photographing camera, a local part of the face of the object while obtaining information on one of oil contents and water contents of the local part;

generating, by a local multi-resolution 3-D face-inherent model generation unit, a local multi-resolution face-inherent model by combining the photograph of the local part with the 3-D face-inherent model; and displaying the local multi-resolution face-inherent model with the obtained information on the one of oil content and water content.

10. The multi-resolution 3-D face-inherent model generation method as claimed in claim 9, wherein controlling, by the control unit, the position of the local photographing camera includes selecting one of an automatic mode automatically controlling the position of the local photographing camera based on characteristic points of a 3-D face standard model based on a common face and a manual mode controlling the position of the local photographing camera based on a position of an operator's input.

11. The multi-resolution 3-D face-inherent model generation method as claimed in claim 10, wherein controlling, by the control unit, the position of the local photographing camera in the automatic mode includes:

converting, by a mapping information conversion unit, mapping information about basic characteristic points, stored in the 3-D face standard model, into the mapping information about characteristic points of the 3-D face-inherent model, and automatically moving, by a local photographing camera movement control unit, the local photographing camera to the position indicated by the mapping information of the characteristic points of the 3-D face-inherent model.

12. The multi-resolution 3-D face-inherent model generation method as claimed in claim 9, wherein controlling, by the control unit, the position of the local photographing camera in the manual mode includes:

externally receiving, by an input coordinate calculation unit, the position of the operator's input and calculating 3-D coordinates of the input position; and moving, by a local photographing camera movement control unit, the local photographing camera to a position indicated by the converted mapping information of the 3-D face-inherent model or the calculated 3-D coordinates.

13. The multi-resolution 3-D face-inherent model generation method as claimed in claim 9, wherein the one of oil contents and water contents are obtained by adhering the local photographing camera to the local part of the object.

* * * * *